(12) United States Patent
Ogura et al.

(10) Patent No.: US 9,873,066 B2
(45) Date of Patent: Jan. 23, 2018

(54) ION-EXCHANGER

(71) Applicant: ROKI CO., LTD., Hamamatsu-shi, Shizuoka (JP)

(72) Inventors: Masaya Ogura, Hamamatsu (JP); Satoshi Shirayanagi, Hamamatsu (JP)

(73) Assignee: Roki Co., Ltd., Hamamatsu-Shi, Shizuoka (JP)

( * ) Notice: Subject to any disclaimer, the term of this patent is extended or adjusted under 35 U.S.C. 154(b) by 198 days.

(21) Appl. No.: 14/847,595

(22) Filed: Sep. 8, 2015

(65) Prior Publication Data

US 2016/0089618 A1  Mar. 31, 2016

(30) Foreign Application Priority Data

Sep. 25, 2014  (JP) ................. 2014-195521

(51) Int. Cl.
*B01D 15/36* (2006.01)
*C02F 1/42* (2006.01)
*B01J 47/012* (2017.01)
*B01D 27/02* (2006.01)
*C02F 103/02* (2006.01)
*H01M 8/04044* (2016.01)
*B01D 24/16* (2006.01)
*B01J 47/024* (2017.01)

(52) U.S. Cl.
CPC .......... *B01D 15/361* (2013.01); *B01J 47/012* (2017.01); *B01D 24/165* (2013.01); *B01D 27/02* (2013.01); *B01D 2201/0423* (2013.01); *B01D 2201/306* (2013.01); *B01D 2201/4015* (2013.01); *B01J 47/024* (2013.01); *C02F 1/42* (2013.01); *C02F 2103/023* (2013.01); *C02F 2201/004* (2013.01); *C02F 2201/006* (2013.01); *H01M 8/04044* (2013.01)

(58) Field of Classification Search
CPC ............................ C02F 1/42; C02F 2001/422; C02F 2001/427; C02F 2103/023; C02F 2201/004; C02F 2201/006; H01M 8/04044; B01D 24/164; B01D 27/02; B01D 2201/0423; B01D 2201/306; B01D 2201/4015; B01D 15/361; B01J 47/024
USPC ......................................... 210/282, 289, 454
See application file for complete search history.

(56) References Cited

U.S. PATENT DOCUMENTS

| | | | | |
|---|---|---|---|---|
| 3,970,566 A | * | 7/1976 | Rosaen | B01D 35/02 210/452 |
| 5,269,913 A | * | 12/1993 | Atkins | B01D 29/23 15/1.7 |
| 2011/0000841 A1 | * | 1/2011 | Rusinov | B29C 45/14336 210/282 |

FOREIGN PATENT DOCUMENTS

JP      2005-149842 A     6/2005
WO   WO 2013167946 A1 * 11/2013  ............ B01J 47/024

* cited by examiner

*Primary Examiner* — Matthew O Savage
(74) *Attorney, Agent, or Firm* — Burr & Brown, PLLC

(57) ABSTRACT

An ion-exchanger includes a case member provided with a cooling liquid flow-in pipe through which cooling liquid is introduced and a cooling liquid discharge pipe through which the cooling liquid is discharged, a cartridge member to be detachably accommodated in the case member, and a number of ion-exchange resin particles sealed within the cartridge member. The cartridge member is provided with an engaging portion detachably engaging with an end portion of the case member, and the case member is provided with an engagement portion to be engaged with the engaging portion provided for the cartridge member.

7 Claims, 5 Drawing Sheets

ION-EXCHANGER

BACKGROUND OF THE INVENTION

Field of the Invention

The present invention relates to an ion-exchanger for removing impurity ion from a cooling liquid in a fuel cell system.

Related Art

In a fuel cell system of a conventional technology, a cooling circuit is provided for forcibly circulating a cooling liquid (coolant) by means of a pump to cool a fuel cell that generates heat in accordance with power generation. In such cooling circuit, the cooling liquid circulates, and if rust or like is produced, impurity ion is generated in the cooling liquid.

It has been known that such impurity ion increases electric conductivity, which results in that electricity generated by a fuel cell leaks externally through the cooling liquid, and hence, a power generation efficiency is lowered, thus providing a problem. In order to solve such problem, an ion-exchanger for removing the impurity ion in the cooling liquid is provided for the cooling circuit of the fuel cell system.

An ion-exchange resin is packed in such ion-exchanger, and an impurity ion is removed from the cooling liquid by passing the cooling liquid through the ion-exchange resin.

It is further to be noted that ion-exchanging capability of the ion-exchange resin is degraded by repeated use for removing the impurity ion, so that it is necessary to periodically exchange the ion-exchange resin.

According to the such reason as mentioned above, it has been known that an invention disclosed in Patent Document 1 (Japanese Patent Laid-open No. 2005-149842) has provided a cartridge-type ion-exchanger capable of discharging water in the cooling circuit so as not to leak from the ion-exchanger during exchanging of a filter cartridge and performing an exchanging working without closing pipes or ducts disposed at for-and-aft positions of the ion-exchanger.

The Patent Document 1 discloses a cooling device including a cooling circuit, for circulating a cooling liquid, formed between a fuel cell stuck and a radiator, and an ion-exchanger for removing ion from a cooling liquid is disposed in the cooling circuit. The ion-exchanger is composed of an exchangeable filter cartridge, a container body in which the filter cartridge is accommodated, and a lid member for closing an opening of the container body through which the filter cartridge is exchanged.

The ion-exchanger of the structure mentioned above is located in a manner such that the opening of the container body is positioned above the highest liquid level in the cooling circuit.

According to the ion-exchanger disclosed in the above Patent Document 1, since the ion-exchanger is located in a manner such that the opening of the container body is positioned above the highest liquid level in the cooling circuit, the filter cartridge can be exchanged with the cooling liquid being kept in the container without discharging the cooling liquid and closing pipes disposed for-and-aft of a filter during the exchanging of the filter cartridge, thereby easily performing the exchanging working.

However, in the structure of the ion-exchanger of the Patent Document 1, since the cooling liquid discharging opening is formed to the lid member, when the lid member is removed at the same time of exchanging the filter cartridge, there is a fear of back-flow of the cooling liquid through the discharge opening, and also, when the filter cartridge is exchanged, it is necessary to remove the lid member, which makes complicated the exchanging working, thus also providing inconvenience.

SUMMARY OF THE INVENTION

The present invention was made in consideration of the circumstances encountered in the prior art mentioned above and an object thereof is to provide an ion-exchanger capable of easily performing an ion-exchanging working of an ion-exchange resin, and preventing a cooling liquid from leaking at an ion-exchanging working.

The above and other objects can be achieved according to the present invention by providing an ion-exchanger including a case member provided with a cooling liquid flow-in portion through which cooling liquid is introduced and a cooling liquid discharge portion through which the cooling liquid is discharged, a cartridge member to be detachably accommodated in the case member, and a number of ion-exchange resin particles sealed within the cartridge member, wherein the cartridge member is provided with an engaging portion detachably engaging with an end portion of the case member, and the case member is provided with an engagement portion to be engaged with the engaging portion.

In the above aspect of the present invention, the following preferred embodiment may be adopted.

It may be preferred that the engagement portion to be engaged with the engaging portion is composed of a groove including a vertical groove portion extending in an axial direction of the case member and an outer peripheral groove portion extending in a circumferential direction of the case member from one end of the vertical groove portion.

It may be preferred that the cartridge member is provided with a bottomed cylindrical cartridge body in which a number of ion-exchange resin particles are sealed and a closing member integrally welded to the cartridge body and formed with the engaging portion.

The closing member may be formed with an oblique surface to a surface facing the ion-exchange resin particles so as to incline toward the discharge portion.

It may be also preferred that the cartridge member is provided with a seal member mounted to an outer peripheral surface so as to extend along the circumferential direction thereof.

It may be also preferred that the flow-in portion is provided to a lower portion of the case member, and the discharge portion is provided to an upper portion thereof.

The cartridge member may be provided with a support frame member supporting the ion-exchange resin particles within the cartridge body.

The flow-in portion and the discharge portion may be formed as pipes or ports.

It is further to be noted that the above preferred embodiments do not provide all the essential features of the present invention, and for example, sub-combination of these embodiments may constitute the present invention.

According to the present invention of the structure mentioned above, the following advantageous effects and functions will be achieved.

In the ion-exchanger of the present invention, since the cartridge member provided with an engaging portion detachably engages with the engagement portion provided for the case member, the cartridge member can be easily exchanged without removing a lid member as closing member formed to the cartridge member.

Further, the engagement portion to be engaged with the engaging portion is composed of a groove including a vertical groove portion extending in an axial direction of the case member and an outer peripheral groove portion extending in a circumferential direction of the case member from one end of the vertical groove portion, so that the cartridge member can be surely fixed to the case member by inserting the engaging portion formed to the cartridge member with the engagement portion along the vertical groove portion and then rotated along the outer peripheral groove portion.

Furthermore, since the cartridge member is provided with the bottomed cylindrical cartridge body in which a number of ion-exchange resin particles are sealed and the closing member integrally welded to the cartridge body, the exchanging working of the ion-exchange resin particles can be easily done. In addition, since the cartridge member can be constituted to be easily detachably. Moreover, since the closing member is formed with an oblique surface inclining toward the discharge portion, the cooling liquid introduced from the lower portion of the ion-exchanger can be more smoothly delivered to the discharge portion.

Still furthermore, the cartridge member is provided with the seal member mounted to an outer peripheral surface so as to extend along the circumferential direction thereof, so that the ion-exchange resin particles and the seal member can be surely exchanged at the same time with high accuracy, and hence, any damage of the seal member can be prevented.

Still furthermore, since the flow-in portion is provided to the lower portion of the case member, and the discharge port is provided to the upper portion thereof, when the cartridge member is exchanged, it is not necessary to disconnect ducts or pipes connected to the flow-in portion and the discharge portion, thus being convenient and advantageous.

Still furthermore, since the cartridge member is provided with the support frame member supporting the ion-exchange resin particles within the cartridge body, the ion-exchange resin particles can be prevented from dropping off therefrom.

The nature and further characteristic features of the present invention will be made clearer from the following description made with reference to the accompanying drawings.

DETAILED DESCRIPTION OF THE INVENTION

Hereunder, a preferred embodiment of the present invention will be described with reference to the accompanying drawings of FIGS. 1 to 5.

It is to be noted that the following embodiment is not limited to the invention defined by appended claims, and all the combination of the subject features of the present embodiment described herein is not essential for the solution of the present invention. It is also noted that terms such as "upper", "lower", "right", "left" and the like term for indicating direction are used herein with reference to the illustration on the drawings.

Figure 1:
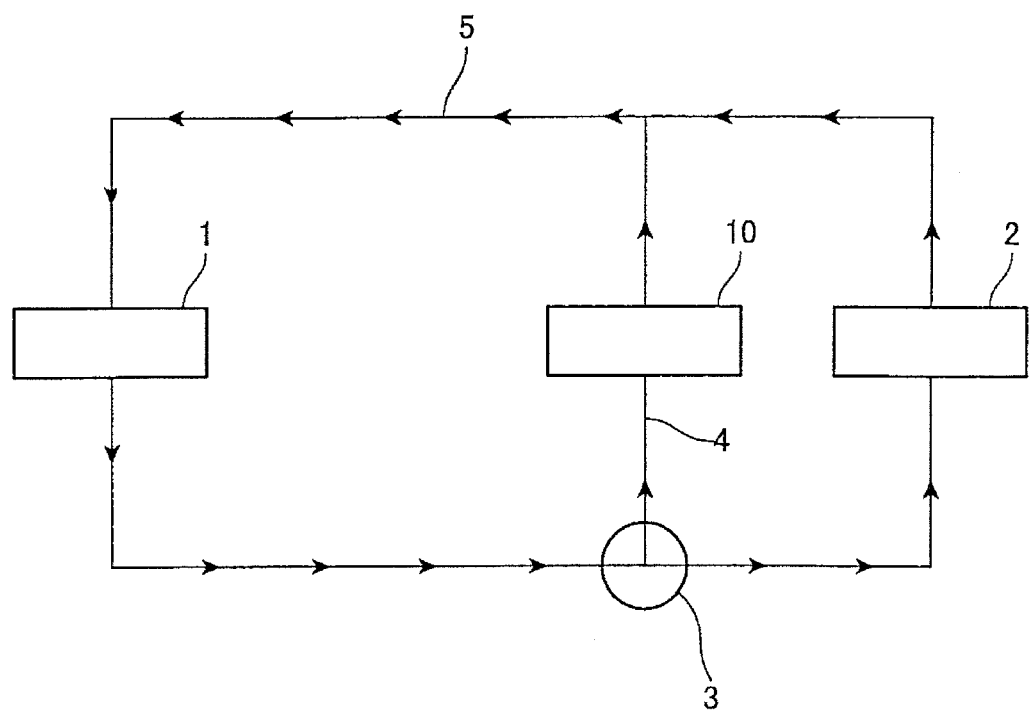
FIG. 1 is a circuit diagram illustrating a cooling circuit for a fuel cell provided with an ion-exchanger according to an embodiment of the present invention.

According to FIG. 1 showing a cooling circuit for a fuel cell, and an ion-exchanger 10 according to the present embodiment is incorporated in the cooling circuit. The cooling circuit is provided with a fuel cell 1 in which air and denatured fuel gas are introduced to thereby generate direct current power, a cooling liquid circulation circuit 5 for cooling the fuel cell, a radiator 2 provided for the cooling liquid circulation circuit 5 for performing heat exchanging operation, a bypass-circuit 4 for circulating the cooling liquid without passing through the radiator 2, the ion-exchanger 10 provided for the bypass-circuit 4 for removing ion in the cooling liquid, and a valve mechanism 3 for adjusting flow rate of the cooling liquid flowing the ion-exchanger 10 according to temperature change of the cooling liquid.

The cooling liquid circulation circuit 5 is provided with a circulation pump for circulating the cooling liquid between the fuel cell 1 and the radiator 2. Heat applied to the cooling liquid from the fuel cell 1 is radiated into atmosphere by the radiator 2.

The valve mechanism 3 acts to increase a flow rate of the cooling liquid flowing in the ion-exchanger at a low temperature period and decrease the flow rate of the cooling liquid flowing on the radiator side, and on the other hand, the valve mechanism 3 further acts to increase the flow rate of the cooling liquid on the radiator side at a high temperature period and decrease the flow rate of the cooling liquid on the ion-exchanger side.

According to the cooling circuit of the structure mentioned above, since the flow rate of the cooling liquid passing through the ion-exchanger 10 at an operation starting time is increased, many ions eluted in the cooling liquid circulation circuit 5 can be removed. In addition, since the flow rate of the cooling liquid flowing on the radiator side at the operation period is increased, large heat generation of the fuel cell 1 can be removed. Accordingly, the flow rate (i.e., flow amount) of the cooling liquid flowing into the ion-exchanger can be adjusted in a range of affecting no adverse influence to the fuel cell 1.

Figure 2:
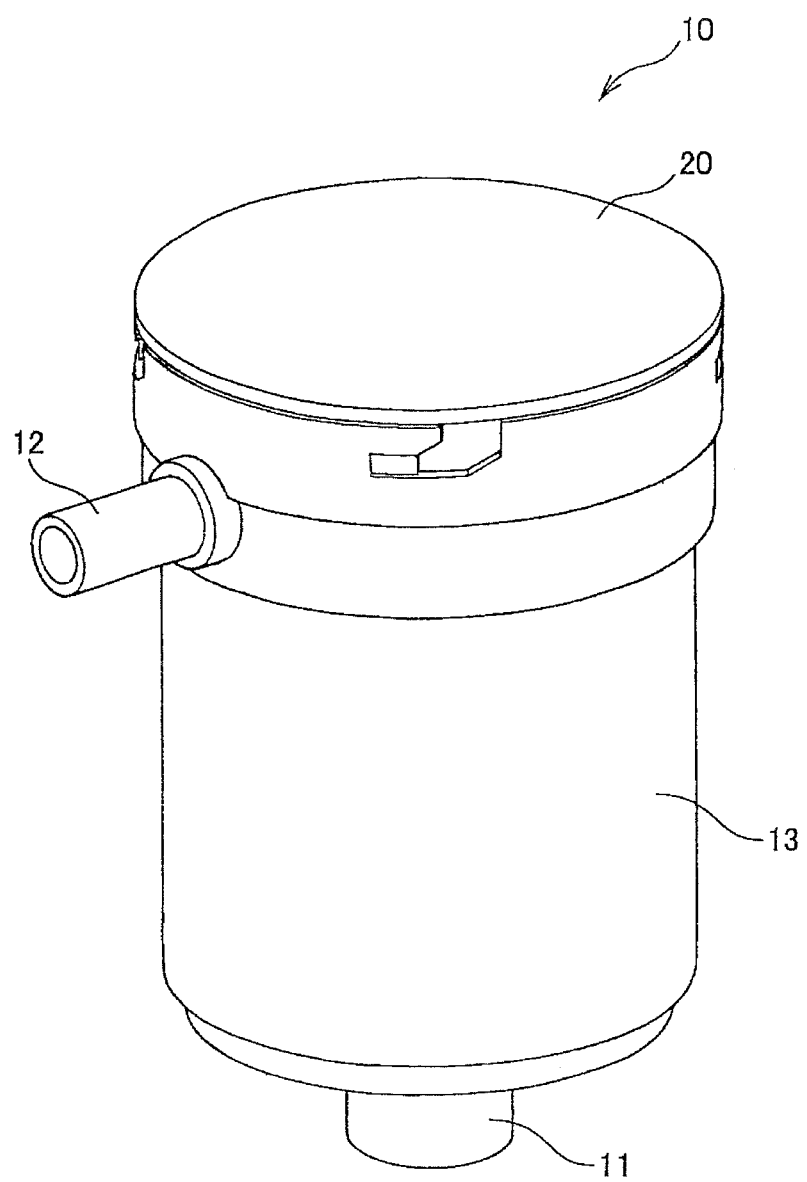
FIG. 2 is a perspective view illustrating the ion-exchanger according to the embodiment of the present invention.

With reference to FIG. 2, the ion-exchanger 10 according to the present embodiment is provided with a case body member 13 and a cartridge member 20 assembled to the case body member 13. The case body member 13 is provided with a flow-in pipe (or inlet pipe) 11 to be connected to the cooling circuit through which the cooling liquid is introduced into the case body member 13 and a discharge pipe (or outlet pipe) 12 connected to the cooling circuit for discharging the cooling liquid to the cooling circuit therefrom. Further, it is to be noted that the flow-in pipe 11 and the discharge pipe 12 may be formed as a flow-in port and a discharge port directly formed to the case body member 13.

Figure 3:
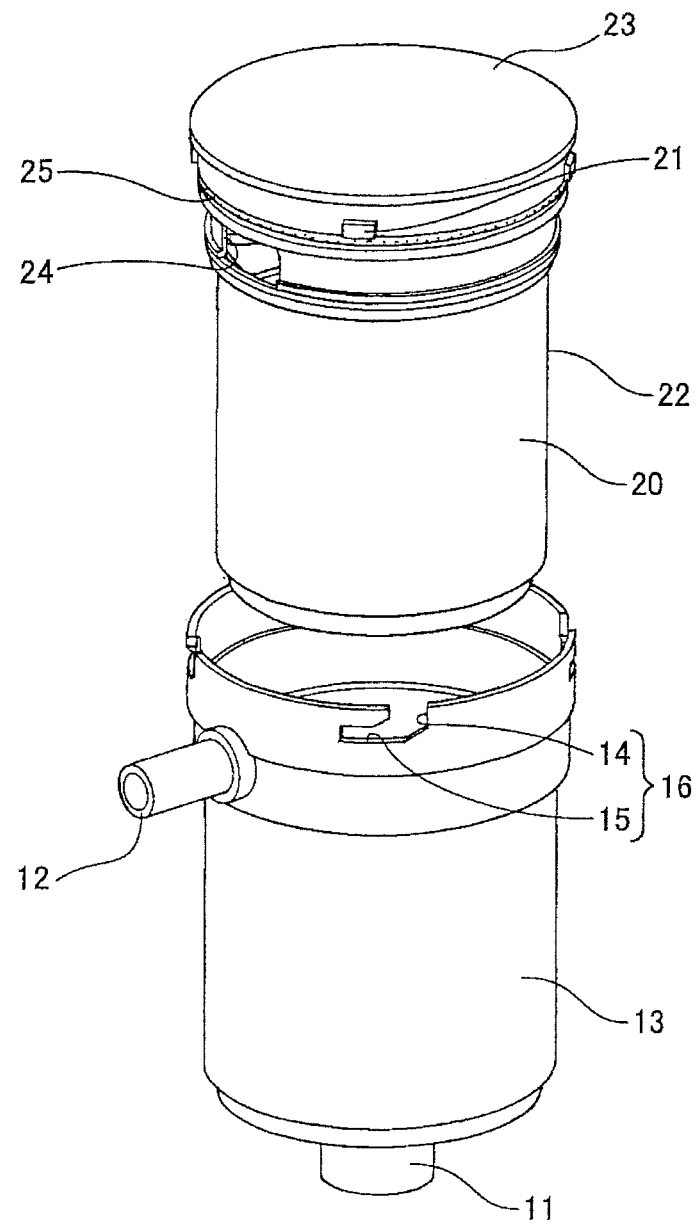
FIG. 3 is an exploded view of the ion-exchanger shown in FIG. 2.

The case body member 13 has a structure, as shown in FIG. 3, into which the cartridge member 20 having a bottomed cylindrical shape can be accommodated. Furthermore, an engagement portion 16 in form of an L-shaped groove is formed to an outer peripheral edge of an opening of the case body member 13, and the engagement portion 16 includes a vertical groove portion 14 extending axially vertically of the case body member 13 and an outer peripheral groove portion 15 extending in the circumferential direction from one end of the vertical groove portion 14.

The cartridge member 20 is provided with a bottomed cylindrical cartridge member body 22 and a closing member 23 welded or fused integrally with the cartridge member body 22 so as to close the opening of the cartridge member body 22. The closing member 23 is formed with a protrusion 21 as an engaging portion to be engaged with the engagement portion 16 of the case body member 13. Further, it is desirable that the closing member 23 is welded to the cartridge member body 22 by means of vibration welding.

Furthermore, the closing member 23 is formed with an opening 24 so as to oppose to an end portion of the discharge pipe 12 of the case body member 13 when assembled thereto for discharging the cooling liquid to the cooling liquid circulation circuit 5 from the opening 24 through the discharge pipe 12. The closing member 23 is further formed, above the opening 24, with a seal member 25 mounted around the circumferential direction thereof. An O-ring formed of an elastic material such as rubber may be preferably used as such seal member 25.

Figure 4:
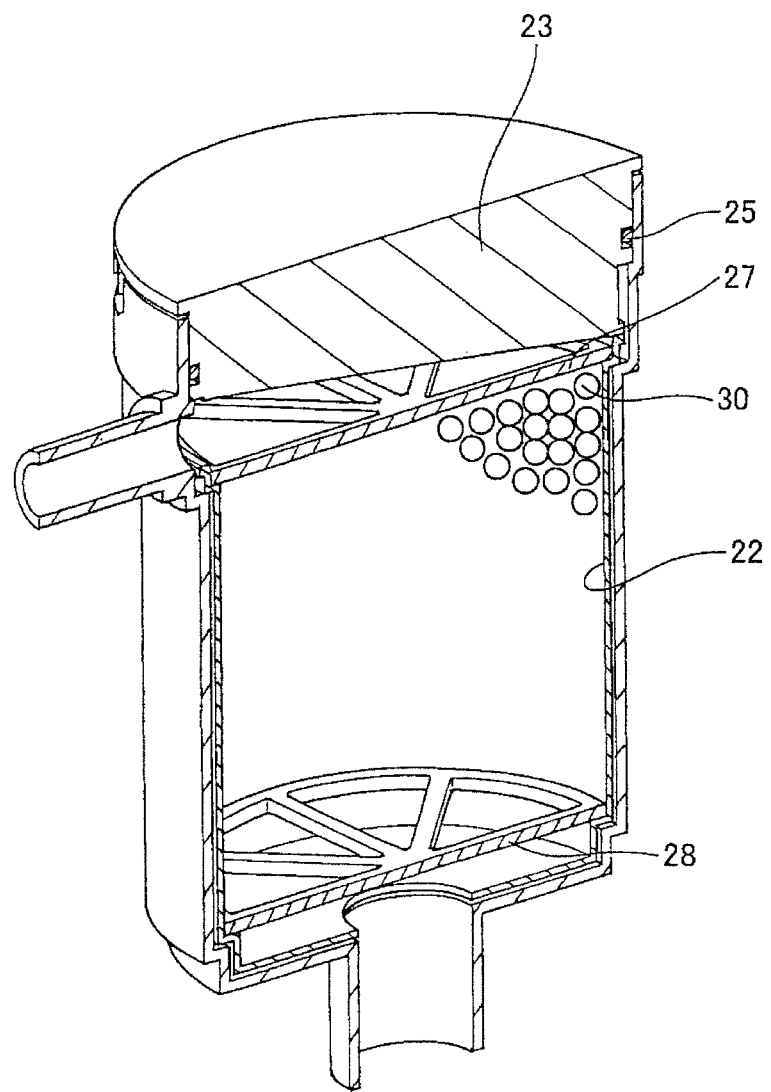
FIG. 4 is a perspective sectional view illustrating the ion-exchanger according to the present embodiment.

As shown in FIG. 4, a number of ion-exchange resin particles 30 (which may be called hereinafter "ion-exchange resin 30") are sealed inside the cartridge member body 22. Furthermore, an upper end support frame member 27 and a lower end support frame member 28 are attached to an upper end portion and a lower end portion of the cartridge member body 22, respectively, so as to prevent the ion-exchange resin particles 30 from getting out through the flow-in pipe 11 or the discharge pipe 12.

The upper and lower support frame members 27 and 28 have fan-like openings formed by radially arranged ribs, respectively, and a mesh member (not shown) having mesh openings of a size smaller than that of the ion-exchange resin particles 30 is attached to the opening of each of the upper and lower support frame members 27 and 28. As mentioned above, the openings are configured to be able to pass the cooling liquid but not pass the ion-exchange resin particles 30.

It may be desired that the cartridge member body 22, the closing member 23, the upper support frame member 27 and the lower support frame member 28 are formed of synthetic resin material.

Figure 5:
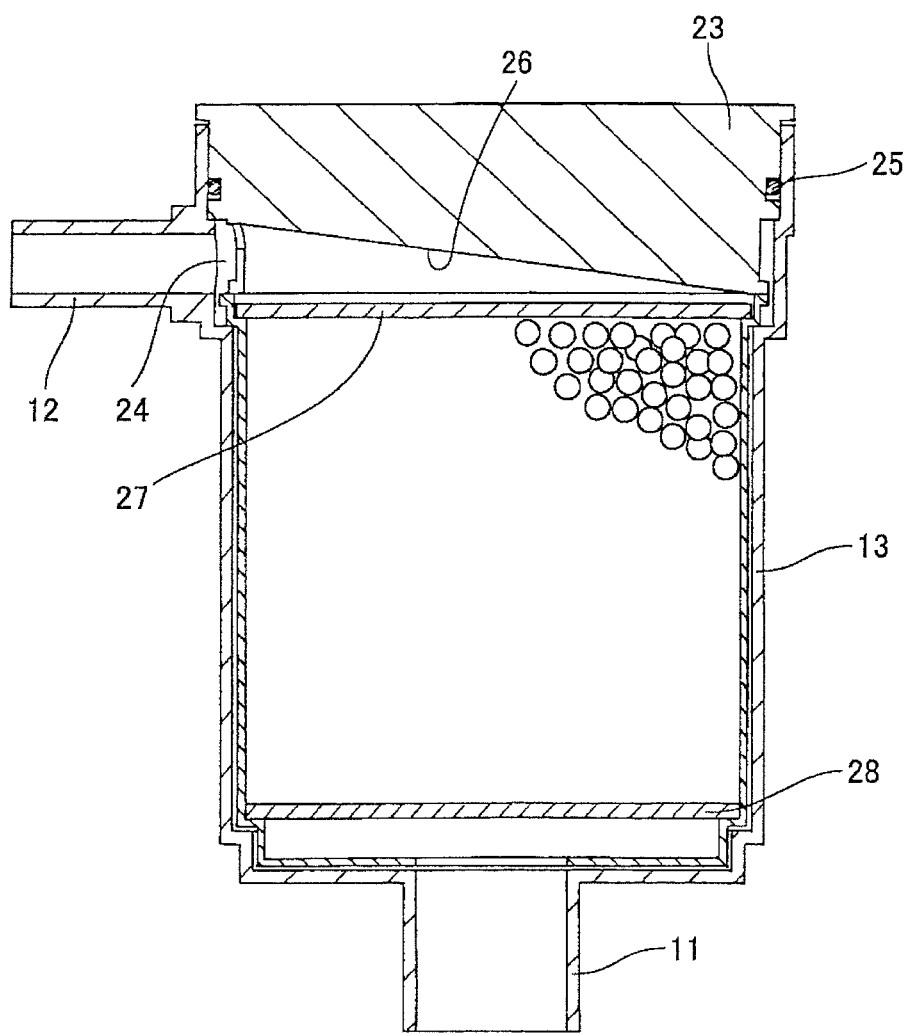
FIG. 5 is a sectional view illustrating the ion-exchanger of the present embodiment.

Furthermore, as shown in FIG. 5, the lower surface of the closing member 23 facing the ion-exchange resin 30 is formed with an oblique surface 26 inclined upward toward the discharge pipe 12. According to such inclined structure, the cooling liquid introduced into the case body member 13 through the flow-in pipe 11 can be smoothly guided to the discharge pipe 12, and air mixed into the cooling liquid can be also smoothly guided to the discharge pipe 12, thus improving air-releasing performance.

In addition, since the seal member 25 is located above the opening 24, the cooling liquid can be prevented from leaking outward of the ion-exchanger 10. Further, any seal member is not disposed below the opening 24 because of the reason such that a major part of the cooling liquid flowing out of the opening 24 is discharged into the cooling liquid circulation circuit 5 through the discharge pipe 12, but the remaining part of the cooling liquid flows to the lower end portion of the case member 13 through a space between the cartridge member 20 and the case member 13 and again flows into the cartridge member 20 through the flow-in pipe 11, and hence, such cooling liquid does not flow outward.

According to the ion-exchanger 10 of the structure or configuration mentioned above, the engagement of the cartridge member 20 can be released only by rotating the cartridge member 20 so as to move the engaging portion 21 along the outer peripheral groove 15. Thus, the cartridge member 20 can be easily mounted or dismounted without undergoing any lid mounting working, and hence, the ion-exchange resin 30 can be also easily exchanged.

Moreover, since the cartridge member 20 is provided with the seal member 25, an old seal member 25 can be also exchanged together with the exchanging of the ion-exchange resin 30. Accordingly, at the time of exchanging, the seal member 25 can be free from any damage and can be surely exchanged.

It is to be noted that the ion-exchanger 10 of the present embodiment may be preferably assembled in a manner such that the position of the discharge pipe 12 corresponds to the maximum liquid level in the cooling circuit. According to such assembling, it is possible to prevent the cooling liquid flowing back from the discharge pipe 12 at the time of taking the cartridge member 20 out of the case member 13 from leaking outward of the cooling circuit. In addition, even in a case where the position of the discharge pipe 12 is not located to the maximum liquid level, the cooling liquid may be prevented from leaking at the time of exchanging the cartridge member 20 by providing a valve mechanism for sealing the flowing of the cooling liquid to the flow-in pipe 11 and the discharge pipe 12.

As mentioned hereinabove, in the ion-exchanger 10 of the present embodiment, although the cartridge member 20 is fixed by the engagement of the engaging portion 21 with the engagement portion 16, in a preferred modification, the cartridge member 20 may be fixed or fastened by means of vis, clip, or the like, and in such modified embodiment, the cartridge member 20 can be surely prevented from dropping off by vibration or like.

Furthermore, in the described embodiment of the ion-exchanger 10, although the engaging portion 21 and the engagement portion 16 are formed as a projection and a groove, in a further preferred modification, the engaging portion 21 and the engagement portion 16 are screw-engaged by one being formed as a female thread and another one being formed as a male thread so as to be engaged with each other. Furthermore, the engaging portion 21 and the engagement portion 16 may be fastened to each other by means of vis or screw.

Furthermore, in the described embodiment of the ion-exchanger 10, although the closing member 23 is welded to the cartridge body member 22 by means of vibration welding, heat welding means may be alternatively utilized.

It is therefore noted that the present invention is not limited to the described embodiment and many other changes and, modifications or alterations such as mentioned above, may be made without departing from the spirit of the present invention and the scope of the appended claims.

What is claimed is:

1. An ion-exchanger comprising:
   a case member provided with a cooling liquid flow-in portion through which cooling liquid is introduced and a cooling liquid discharge portion through which the cooling liquid is discharged;
   a cartridge member to be detachably accommodated in the case member; and
   a number of ion-exchange resin particles sealed within the cartridge member, wherein
   the cartridge member is provided with an engaging portion detachably engaging with an end portion of the case member, and the case member is provided with an engagement portion to be engaged with the engaging portion,
   the cartridge member is provided with a bottomed cylindrical cartridge body in which the ion-exchange resin particles are sealed and a closing member integrally welded to the cartridge body and formed with the engaging portion, and the closing member is formed with an oblique surface facing the ion-exchange resin particles so as to incline toward the discharge portion.

2. The ion-exchanger according to claim 1, wherein the engagement portion to be engaged with the engaging portion is composed of a groove having a vertical groove portion extending in an axial direction of the case member and an outer peripheral groove portion extending in a circumferential direction of the case member from one end of the vertical groove portion.

3. The ion-exchanger according to claim 1, wherein the cartridge member is provided with a seal member mounted to an outer peripheral surface so as to extend along the circumferential direction thereof.

4. The ion-exchanger according to claim 1, wherein the flow-in portion is provided to a lower portion of the case member, and the discharge portion is provided to an upper portion thereof.

5. The ion-exchanger according to claim 1, wherein the ion-exchange resin particles sealed in the cartridge body have a size, and the cartridge body is provided with a support frame member and a mesh member attached to the support frame member, with the mesh member having openings that are smaller in size than the size of the ion-exchange resin particles, such that the frame member and the mesh member support the ion-exchange resin particles within the cartridge body.

6. The ion-exchanger according to claim 1, wherein the flow-in portion is formed as a flow-in pipe and the discharge portion is formed as a discharge pipe.

7. The ion-exchanger according to claim 1, wherein the flow-in portion is formed as a flow-in opening port and the discharge portion is formed as a discharge opening port both being formed to the case member.

* * * * *